(12) United States Patent
Bostick et al.

(10) Patent No.: US 10,594,954 B2
(45) Date of Patent: *Mar. 17, 2020

(54) DYNAMIC AND CONTEXTUAL DATA REPLACEMENT IN VIDEO CONTENT

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/410,792

(22) Filed: May 13, 2019

(65) Prior Publication Data

US 2019/0268553 A1 Aug. 29, 2019

Related U.S. Application Data

(63) Continuation of application No. 15/901,482, filed on Feb. 21, 2018, now Pat. No. 10,348,981.

(51) Int. Cl.
*H04N 5/272* (2006.01)
*G06F 7/00* (2006.01)
*G06T 7/00* (2017.01)

(52) U.S. Cl.
CPC ............... *H04N 5/272* (2013.01); *G06T 7/00* (2013.01)

(58) Field of Classification Search
CPC ..................................................... H04N 5/272
See application file for complete search history.

(56) References Cited

PUBLICATIONS

List of all IBM related applications, Appendix P 2019.

*Primary Examiner* — Michael E Teitelbaum
(74) *Attorney, Agent, or Firm* — Garg Law Firm, PLLC; Rakesh Garg; James Nock (57) ABSTRACT

A user factor is analyzed to establish a context in which a user will view a video segment. A data source is selected from a metadata associated with an enhanced video segment. Replacement data is obtained from the data source, where the replacement data corresponds to the context. The replacement data is arranged in a layout, the layout being selected from the metadata according to a device feature of a device on which the user will view the video segment. A set of pixels that represents a first data in a data overlay in the frame is changed, the changed set of pixels representing the layout containing the replacement data. A modified video segment is transmitted, which includes a video content from the video segment and the changed set of pixels.

20 Claims, 7 Drawing Sheets

DYNAMIC AND CONTEXTUAL DATA REPLACEMENT IN VIDEO CONTENT

TECHNICAL FIELD

The present invention relates generally to a method, system, and computer program product for replacing data that is overlaid on video content. More particularly, the present invention relates to a method, system, and computer program product for dynamic and contextual data replacement in video content.

BACKGROUND

Hereinafter, "video" refers to visual content presented in a manner to show or simulate motion relating to visual objects. A segment of video is a portion of vide that runs for some period of time. "Data overlay" in a video, or "data overlaid on video" refers to textual content that can be overlaid, i.e., visually presented over or embedded in the other visual content of the video.

Standard video includes a number subsequent images or frames for each second of the video (knows as frames per second). Each frame is a static image. In many cases, data is overlaid on video by having those frames of a video segment, where data overlay is desired, carry not only the static images of the video content but also images of the data.

For example, a documentary video segment on Egypt made in year 2000 might have data overlay in some parts of the video segment, and the data overlay might include population and demographic information about Egypt at the time the documentary was made. The video content of the video segment might still be relevant to a person viewing the documentary in year 2018, but the data from year 2000 in the data overlay may lose its relevance, become obsolete, or may even become untrue in year 2018.

Many video segments are re-shot at great expense to present current or new data. Video segments pertaining to tourism, finance, sports, education, science, politics, and many other fields include data overlays, which become statically fixed in the frames of the video and become stale, outdated, or incorrect with the passage of time.

SUMMARY

The illustrative embodiments provide a method, system, and computer program product. An embodiment includes a method that analyzes a user factor to establish a context in which a user will view a video segment. The embodiment selects, from a metadata associated with an enhanced video segment, a data source. The embodiment obtains, from the data source, replacement data, the replacement data corresponding to the context. The embodiment arranges the replacement data in a layout, the layout being selected from the metadata according to a device feature of a device on which the user will view the video segment. The embodiment changes a set of pixels that represents a first data in a data overlay in the frame, the changed set of pixels representing the layout containing the replacement data. The embodiment transmits a modified video segment, the modified video segment comprising a video content from the video segment and the changed set of pixels.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that two major issues presently affect the video segments with data overlay. First, the data of the data overlay begins to age as soon as the data overlay is fixed into the frame image of the video along with the other visual image of the frame. As recognized herein, presently, replacing stale data is an expensive and sometimes cost prohibitive proposition. Consequently, viewers/users are left with irrelevant or incorrect data from the video segment.

Second, the data that is overlaid in a video segment is presently selected by the producer, commentator, or some entity other than the target user. The illustrative embodiments recognize that not every user is interested in the same data, can comprehend the same data equally, or is even authorized to view the same data. The same data can have differing degrees of relevance to different users depending upon the contextual aspects (user factors) of the user.

A user factor is an aspect of the user, which is indicative of the context in which the user is viewing, or is likely to view, a video segment. A context of viewing a video segment is a circumstance in which the video segment will be viewed. Some examples of user factors include but are not limited to—a geographical location of the user, a role assigned to the user, a level of language comprehension associated with the user, an age of the user, a job performed by the user, and the like.

Thus, the illustrative embodiments recognize that the present method of overlaying data in a video segment not only makes keeping the data current difficult but also does not take into account the user-specific contexts for relevance to the user. Therefore, the illustrative embodiments recognize that this currently-used manner of presenting data in video segments is of limited utility and unmanageable once fixed in the frame image.

Furthermore, the illustrative embodiments recognize that once the data overlay is fixed or embedded into the frame image, the data overlay also becomes inflexible for accommodating devices with differing display capabilities. Presently, video content can be optimized and resized for presentation on different device, e.g., for displaying on differently sized displays of a computer and a mobile device. However, while the entire frame can be resized, the data overlay that has become fixed within the frame's image cannot be resized within the frame. This inability to alter the visual layout of the data overlay in the frame causes truncation, garbling, or off-screen presentation of the data overlay when the target display device characteristics change.

The illustrative embodiments recognize that the presently available tools or solutions do not address these needs/problems or provide adequate solutions for these needs/problems. The illustrative embodiments used to describe the invention generally address and solve the above-described problems and other related problems by dynamic and contextual data replacement in video content.

An embodiment can be implemented as a software application. The application implementing an embodiment, or one or more components thereof, can be configured as a modification of an existing video presentation system—e.g., a native application in a video streaming server, as an application executing in a data processing system communicating with an existing video presentation system over a wired or wireline local area network (LAN)—i.e., a local application on the LAN, as an application executing in a data processing system communicating with an existing video presentation system over a wide area network (WAN)—i.e., a remote application on the WAN, as a separate application that operates in conjunction with an existing video presentation system in other ways, a standalone application, or some combination thereof.

An embodiment analyzes the frames of a video segment to identify those frames in which a data overlay is present. Some, all, or none of the frames of a video segment may include a previously embedded data overlay.

For a data overlay, the embodiment constructs a set of layouts for the data overlay. Within the scope of the illustrative embodiments, a layout is a visual template using which data can be arranged for suitably presenting on a particular display configuration. The embodiment may construct one or more alternative layouts for the data overlay.

An embodiment adds metadata to the video segment. In the metadata, the embodiment adds a layout or a reference to a layout, that has been constructed for a subset of frames in the segment. Different subsets of frames in the segment may, but need not necessarily, use different data overlays, and consequently different sets of alternative layouts.

An embodiment further analyzes the frames where data overlay is present to identify the type of data contained in the data overlay. For example, natural language processing (NLP) techniques can be applied to the image in a frame to understand the characteristics of data presented in the frame's overlay. A characteristic of the data of a data overlay may include, but is not limited to—an entity or concept represented by the data (e.g., population, statistical result, financial amounts, and the like), a time period in which the entity or concept represented by the data was valid, a time period in which the entity or concept represented by the data is to be valid, a level of detail in the data, a level of comprehension required to understand the data, a geographical location or area in which the data is to be relevant, a desired shift in the mood or sentiment of a user that is to be achieved by the data, an area of interest represented by the data, and many others.

An embodiment determines a data source from which replacement data of a desired characteristic can be obtained or sourced. The replacement data may be more current, pertain to a different period, more or less detailed, more or less mood-shifting, relate more or less to an area of interest, relate more or less to a geographical location or area, that the existing data in the fixed overlay in the frame. From this disclosure, those of ordinary skill in the art will be able to conceive other ways in which the replacement data sourced from a data source can differ from the existing data in the existing data overlay of the frame. Such other differences are contemplated within the scope of the illustrative embodiments.

An embodiment may identify one or more data sources for replacement data, and each sourced replacement data is a candidate for replacing the existing data. The replacement data sourced from different sources may bear different characteristics. Replacement data of different characteristics are usable with users having different user factors (or with the same user but under different user factors.)

An embodiment adds, in the metadata of the segment, references to the set of data sources that can supply replacement data for the data overlay in a subset of frames of the segment. Multiple sets of data source references may thus be populated in the metadata of the segment if different subsets of frames include different data overlays in the segment. A reference to a data source comprises any suitable form of an address or identifier using which the data source can be reached form the data processing system where the embodiment may be executing.

Thus, an embodiment enhances the original video segment with metadata. The metadata includes layouts and data source references relating to subset of frames in the segment. The embodiment saves the enhanced video segment (or a reference thereto), in a repository. When a request for the video segment is made by a user, an embodiment serves the content form the enhanced video segment as described herein.

An embodiment receives a request for a video segment from a video client application on a user's device. The embodiment also receives information about the device's display capabilities (device features), such as the screen size, orientation, available display area, resolution, supported color palette, and the like. In one circumstance, the information about the device's capabilities may be included in the request for the segment.

The embodiment also receives a set of user factors. For example, suitable sensors, apparatus, and biometric devices on the user's device may be able to determine indicators of the user's mood (agitated expression from a facial image analysis, elevated heartrate through heartrate monitor, skin conductivity sensor detecting a change due to perspiration, etc.). as another example, a location module in the device may be able to determine the user's latitude, longitude, altitude, and/or velocity via a Global Positioning System (GPS) or cellular triangulation. A social media profile configured in the device may inform about the user's areas of interest, level of comprehension, and other sensibilities. An accessibility setting in the device may inform about a desired setting of the user. From this disclosure, those of ordinary skill in the art will be able to conceive many other ways of determining these and other user factors, and the same are contemplated within the scope of the illustrative embodiments.

An embodiment analyzes the user factors to determine a context in which the user is requesting the video segment. Based on the determined context, and suitability for a user factor of the user, the embodiment selects from the metadata of the enhanced version of the requested segment, a data source from which to source replacement data for a subset of frames. Based on the information about the device's capabilities, the embodiment selects a suitable layout from the metadata of the segment.

The embodiment processes the replacement data received from the selected data source. The processing includes at least fitting the replacement data in the selected layout.

The embodiment replaces the fixed data overlay with the layout containing the replacement data. The replacement of the fixed data overlay can take any suitable form depending upon the nature of the fixed data overlay. In one example embodiment, the layout covers or obscures the fixed data overlay such that the outdated data of the fixed data overlay is rendered invisible by the replacement data in the selected layout. In another embodiment, the pixels representing the old data overlay are modified to represent the replacement data in the selected layout. In another embodiment, the pixel modification may modify the entire frame.

The video segment with the subset of frames containing the replacement data in the selected layout is transmitted to the client application. In this manner, the user receives the video content of the original video segment overlaid with replacement data instead of the original data that was originally fixed into the frames of the original video segment. Returning to the example of the documentary on Egypt, an embodiment enables the user to receive the video portion of the same documentary that was produced in the year 2000, but with population and demographic data from 2018—the year in which the user is viewing the documentary.

In one embodiment, additional, different, or changes in user factors may be received while the video segment is being transmitted or streamed to the user. In such an embodiment, the replacement data and/or the layout can be dynamically changed, i.e., changed in response to the newly received user factors. For example, if the user appears to be unhappy with the level of detail of the initial replacement data in one subset of frames, a different data source can be selected for a different subset of frames that can provide replacement data of a different level of detail such that the user's sentiment can be shifted to a more satisfied sentiment while the segment streams to the user.

The manner of dynamic and contextual data replacement in video content described herein is unavailable in the presently available methods. A method of an embodiment described herein, when implemented to execute on a device or data processing system, comprises substantial advancement of the functionality of that device or data processing system in providing video content with data overlay that is more current or contextually relevant to the user than the original data overlaid on the video content in a video segment.

The illustrative embodiments are described with respect to certain types of content, data, overlays, layouts, data sources, contexts, user factors, replacement data, processing, device capabilities, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
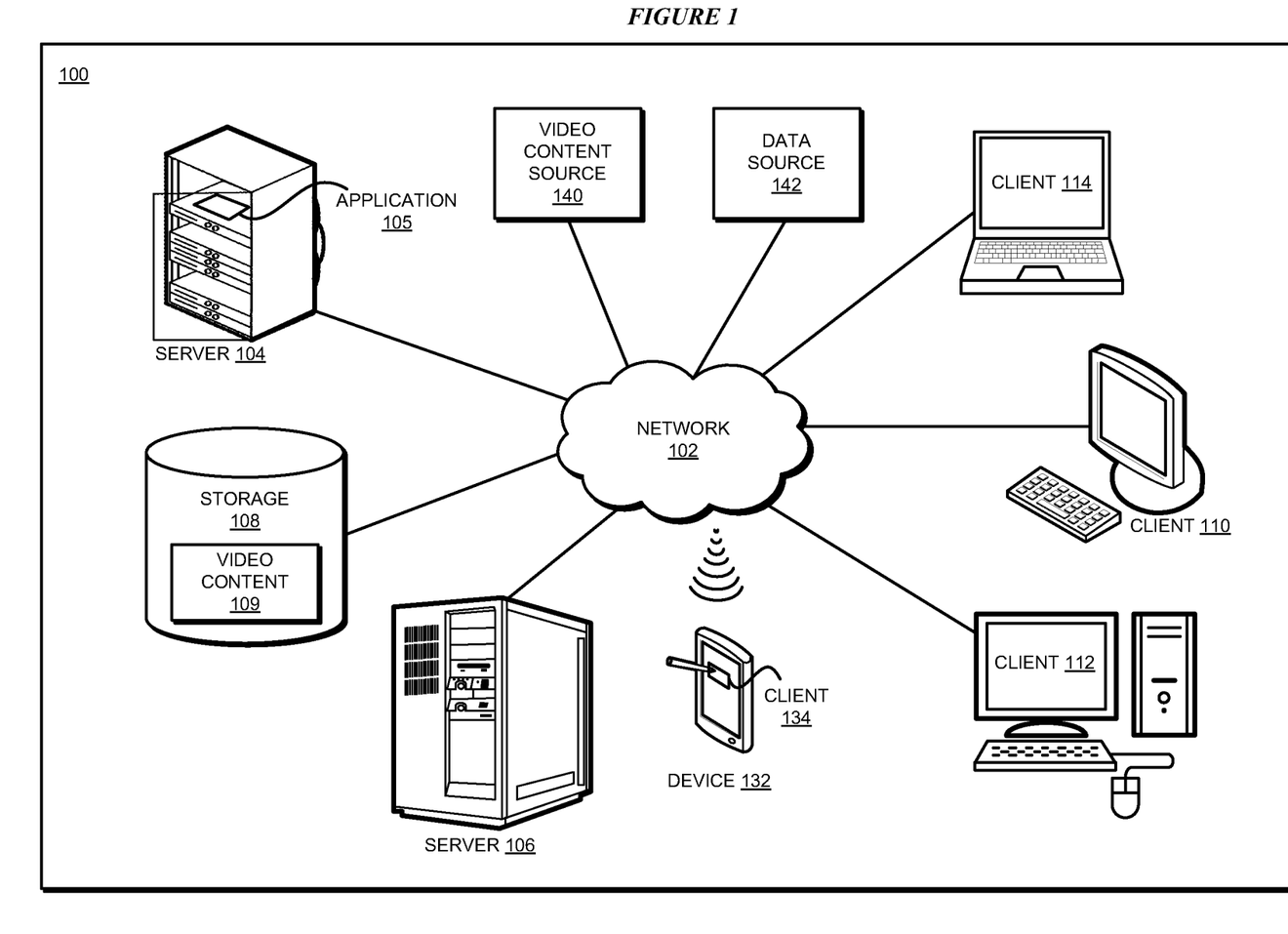
FIG. 1 depicts a block diagram of a network of data processing systems in which illustrative embodiments may be implemented.
Figure 2:
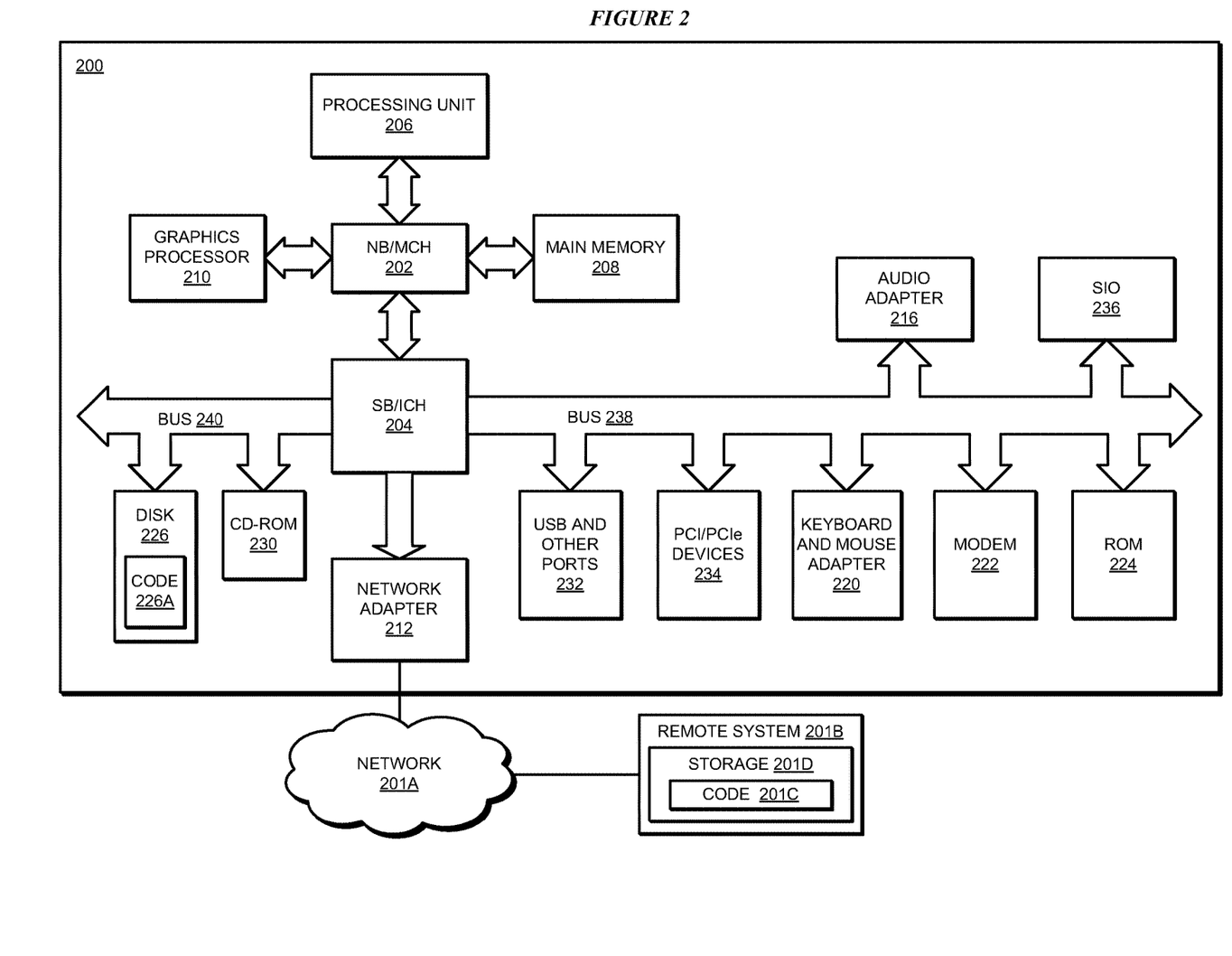
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 implements a remotely usable function (remote) of an embodiment described herein. Application 111 implements a locally usable function (local) or a natively usable function (native) of an embodiment described herein. Application 134 implements a natively usable function (native) of an embodiment described herein. Applications 105 and 134 can be used in a combination to distribute certain functions of an embodiment. Application 105 performs the frame analysis, metadata construction, contextual analysis of user factors, contextual data replacement in a frame, transmission of a video segment including a frame with contextual data replacement in a layout, other operations described herein, or some combination thereof. Application 134 is usable by a user to receive a video segment for viewing. Application 134 transmits to application 105 information about the capabilities of device 132, one or more user factors, a request for a video segment, user factor updates, or some combination thereof. Application 134 may perform these functions autonomously or upon activation by application 105. Source 140 is a source of the video content of an original video segment, which may or may not include frames with data overlay. Data source 142 is one of possibly several data sources that can provide contextually relevant replacement data for replacement in a frame, as described herein. Original video segments, enhanced video segments, or both may be stored as video content 109 in repository 108, which is accessible to application 105. In one case, server 104 executing application 105 is an intermediary system between video content source 140 and device 132, such that a request for a video segment made from device 132 is directed at source 140, but intercepted by application 105. Application 105 performs one or more operations on the requested video segment, as described herein, and either responds directly to device 132 with a modified video segment (i.e., video segment including contextual replacement data in a layout in a frame) or returns the modified video segment to source 140, which can then respond to device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
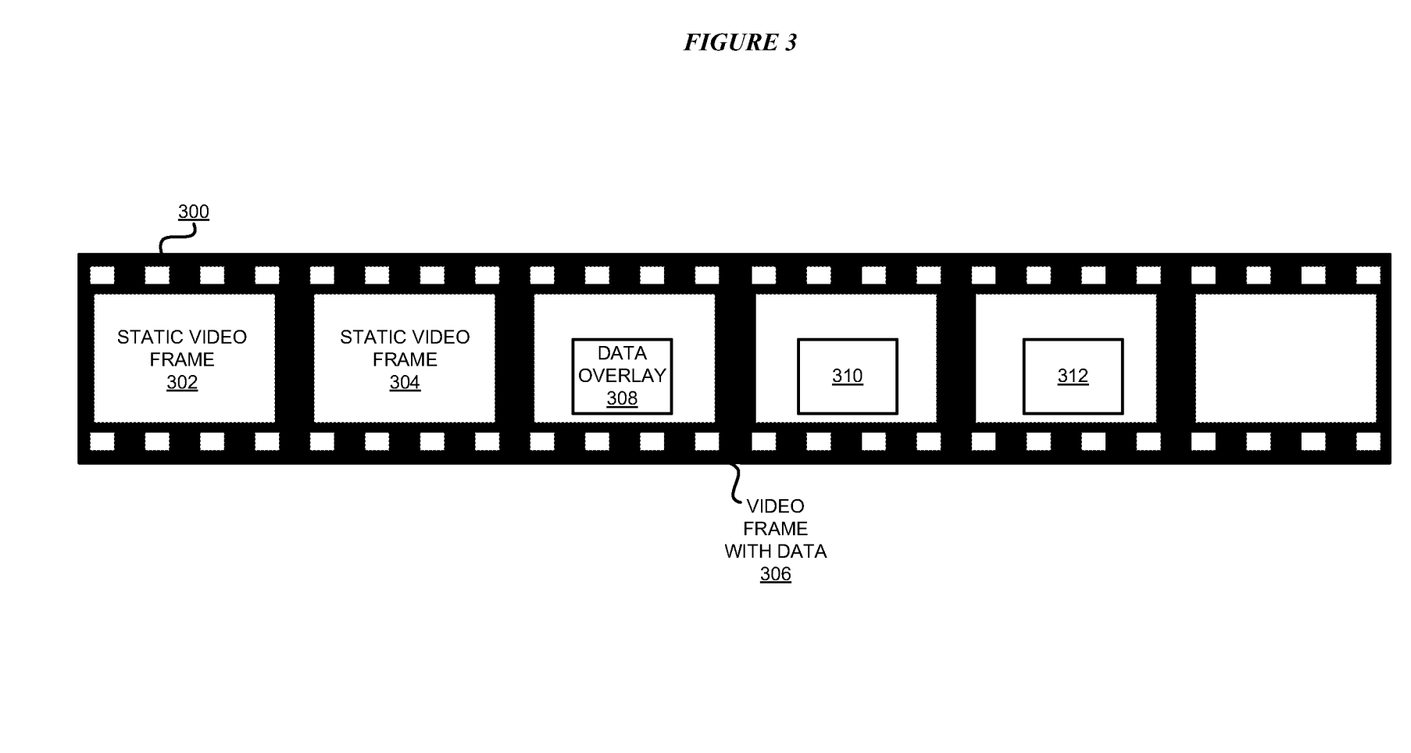
FIG. 3 depicts a block diagram of an example configuration for dynamic and contextual data replacement in video content in accordance with an illustrative embodiment.

With reference to FIG. 3, this figure depicts a block diagram of an example configuration for dynamic and contextual data replacement in video content in accordance with an illustrative embodiment. Video segment 300 is an example of an original video segment as described herein. For example, video content source 140 may produce video segment 300, video segment 300 may be video content 109 stored in repository 108 in FIG. 1, or both.

Segment 300 may, but not necessarily, include certain frames that contain only static frame images, e.g., frames 302 and 304. Segment 300 may also include, but not necessarily, certain frames that include a fixed/static image of a data overlay that is combined with the fixed/static image of the video frame. Frame 306 is an example of such a frame and includes data overlay 308 in the described manner. More than one frame may include the same data overlay as overlay 308. Segment 300 may also include different subsets of frames that include different data overlays, such as frames including overlay 310 and 312.

Figure 4:
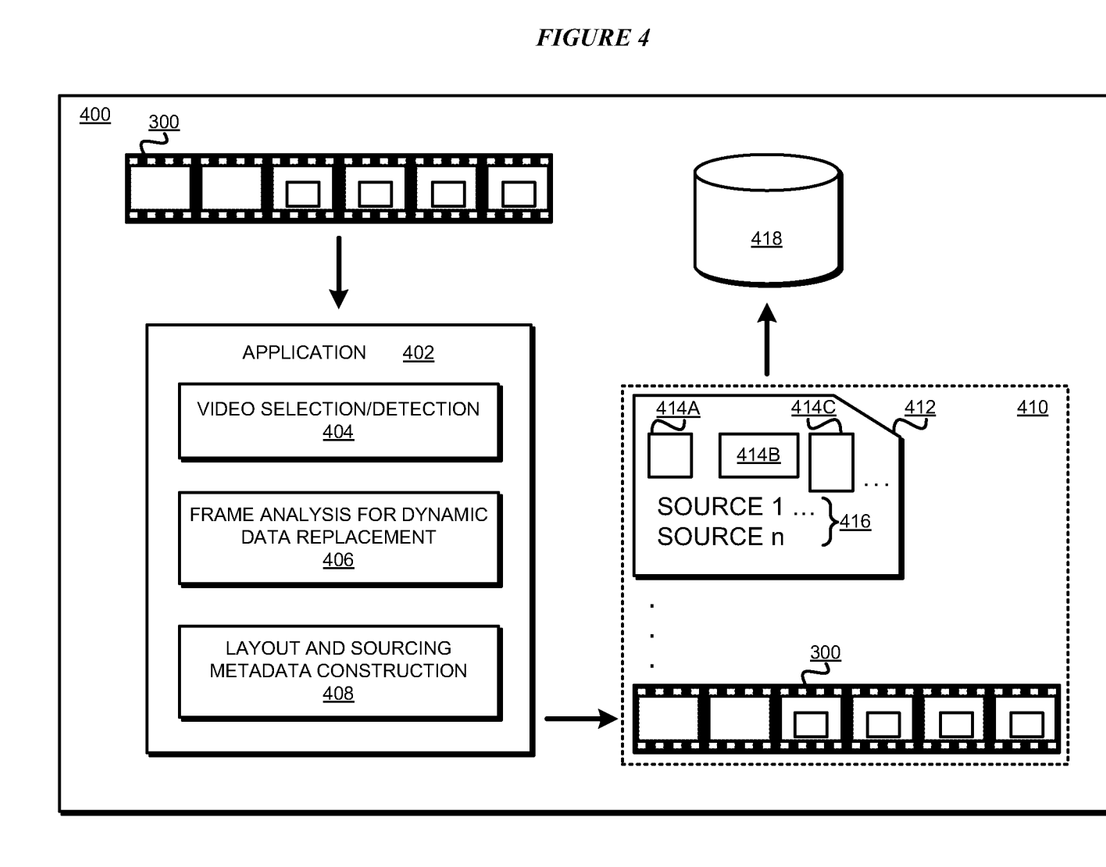
FIG. 4 depicts an example configuration for constructing enhanced video segments with metadata in accordance with an illustrative embodiment.

With reference to FIG. 4, this figure depicts an example configuration for constructing enhanced video segments with metadata in accordance with an illustrative embodiment. Segment 300 is the same as in FIG. 3. Application 402 is an example of application 105 in FIG. 1.

Component 404 selects video segment 300 for metadata construction. In one case, the selection of segment 300 may be a part of a batch job, i.e., regardless of a demand for segment 300 but based on the availability of segment 300. In another case, segment 300 may be selected by component 404 on-demand, i.e., when a request for segment 300 is received or detected.

Component 406 performs frame analysis for dynamic data replacement as described herein. Component 408 constructs the metadata for segment 300 and outputs enhanced video segment 410.

As described herein, enhanced segment 410 includes segment 300 and metadata 412 prepared by component 408. Specifically, metadata 412 includes a set of layouts, such as layouts 414A, 414B . . . 414C, and a set of data sources, such as set 416 comprising source 1 . . . n. Enhanced segment 410 may be stored in repository 418, which is an example of repository 108 in FIG. 1, or returned to a source of segment 300, e.g., to source 140 in FIG. 1.

Figure 5:
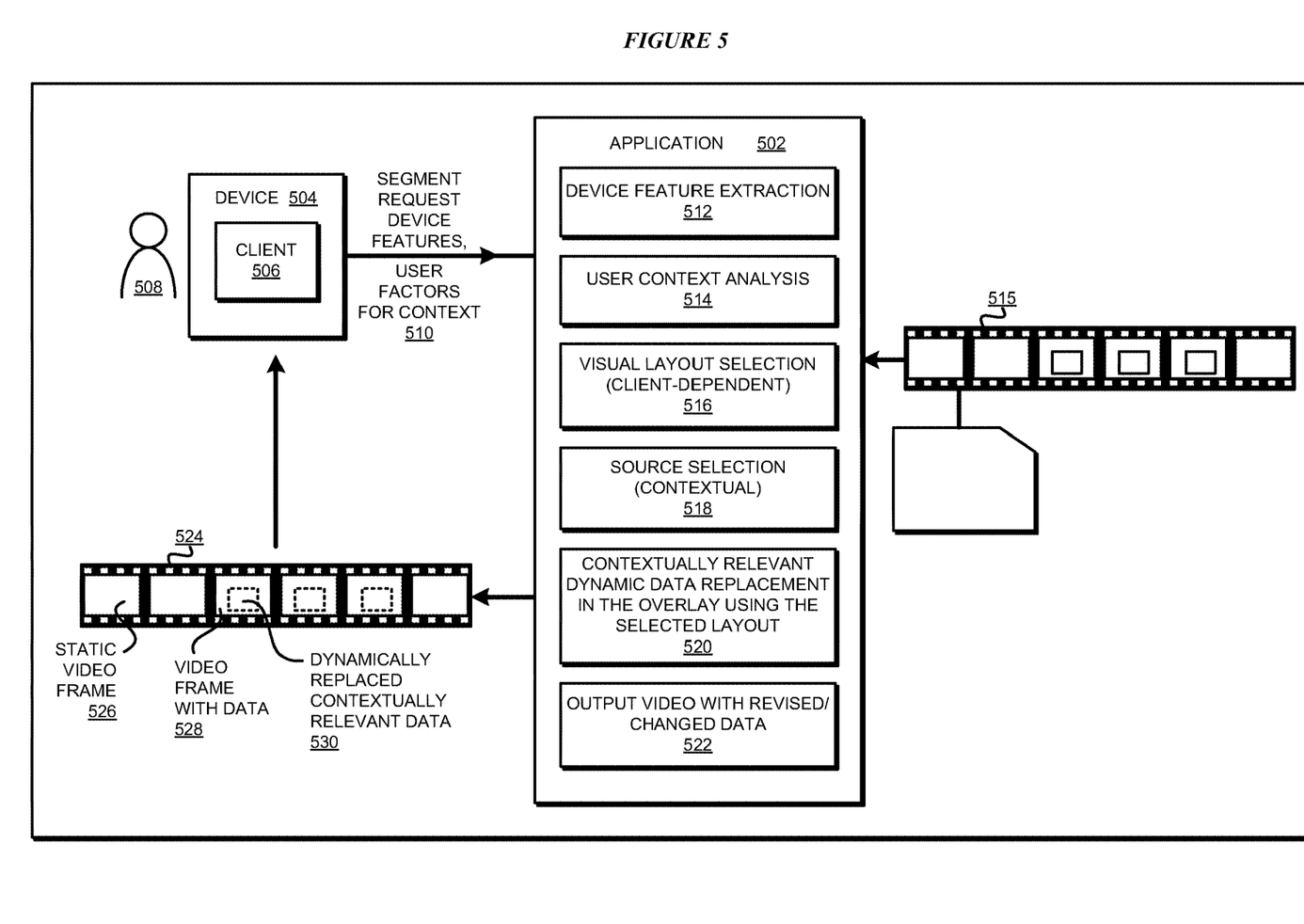
FIG. 5 depicts a block diagram of an example configuration for dynamic and contextual data replacement in video content in accordance with an illustrative embodiment.

With reference to FIG. 5, this figure depicts a block diagram of an example configuration for dynamic and contextual data replacement in video content in accordance with an illustrative embodiment. Application 502 described operations in addition to the operations of application 402 in FIG. 4. The operations of application 402 and application 502 can be implemented together as application 105 or distributed in separate applications within the scope of the illustrative embodiments.

Device 504 is an example of device 132 in FIG. 1 and executes client 506. Client 506 is an example of application 134 in FIG. 1. User 508 uses client 506 to request and view a video segment. Client 506 may be configured with functions to determine the display and video playback capabilities (features) of device 504, determine or collect one or more user factors, or both.

Client 506 transmits request 510, which includes an identifier of a requested video segment, a set of device features, and a set of user factors. Request 510 may be directed to application 502, detected by application 502, intercepted by application 502, or redirected to application 502.

Component 512 extracts or otherwise determines one or more device features from request 510. Component 514 performs a context analysis of the user—to determine a context in which the user wishes to view the requested segment—using one or more user factors from request 510.

Application 502 selects, obtains or retrieves enhanced video segment 515. Enhanced segment 515 has either been pre-created and stored as a part of a batch job, or is created on-demand upon request 510, as described with respect to FIG. 4. Once enhanced segment 515 is available to application 502, and depending on the device features computed by component 512, component 516 selects a suitable layout from the metadata of enhanced segment 515.

Depending on the contextual analysis of the user factors by component 514, component 518 selects a data source from the metadata of enhanced segment 515 from where to obtain the replacement data that will be contextually relevant and/or current. Component 520 processes the replacement data, if needed, and arranges the processed replacement data in the selected layout as a replacement of the fixed data overlay in the original segment.

Component 522 outputs modified video segment 524. Modified segment 524 may include certain frames, such as frame 526 which only contain static frame images without a data overlay, and/or certain frames, such as frame 528 in which an originally fixed data overlay has been dynamically replaced by contextually relevant data 530. Modified segment 524 is returned to client 506 for playback in response to request 510.

Figure 6:
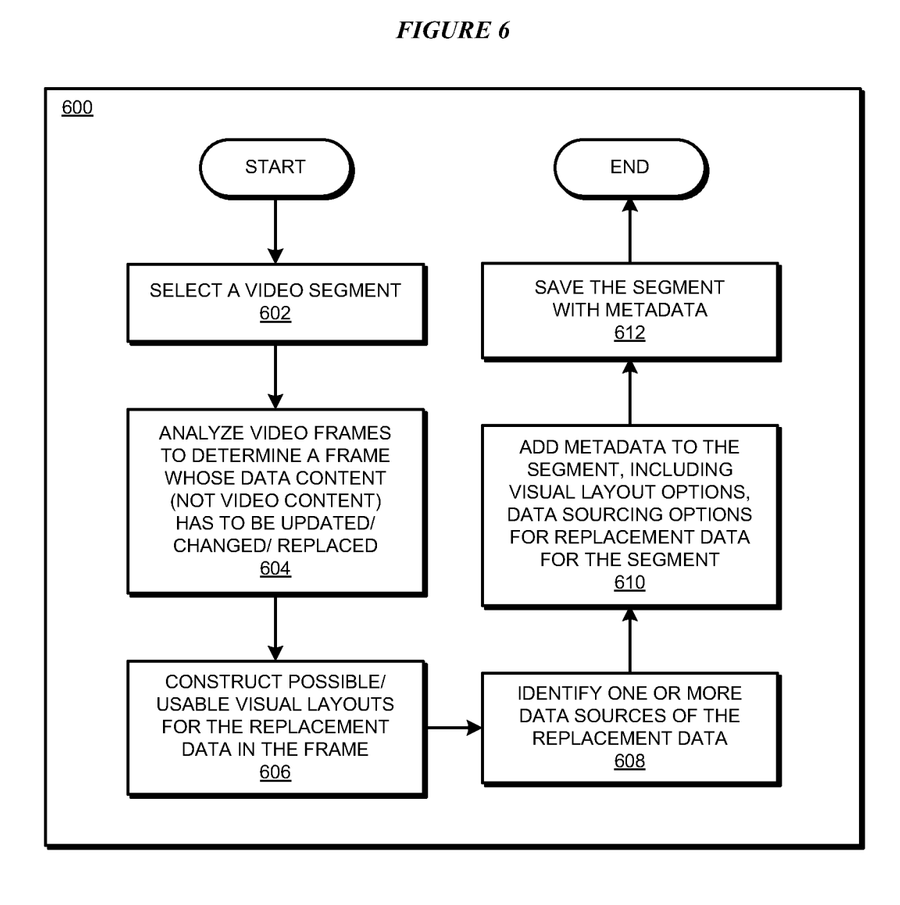
FIG. 6 depicts a flowchart of an example process for constructing enhanced video segments in accordance with an illustrative embodiment.

With reference to FIG. 6, this figure depicts a flowchart of an example process for constructing enhanced video segments in accordance with an illustrative embodiment. Process 600 can be implemented in application 402 in FIG. 4.

The application selects an original video segment (block 602). The application analyzes the frames of the segment to determine a frame whose data content has to be updated, changed, or otherwise contextually replaced (block 604).

The application constructs a set of possible visual layouts that are usable for arranging the replacement data in the frame determined at block 604 (block 606). The application identifies a set of data sources which can provide the replacement data for the frame (block 608). The application adds metadata to the segment, the metadata including the set of layouts and the set of sources, or references thereto (block 610). The application saves the segment and the associated metadata as the enhanced segment (block 612). The application ends process 600 thereafter.

Figure 7:
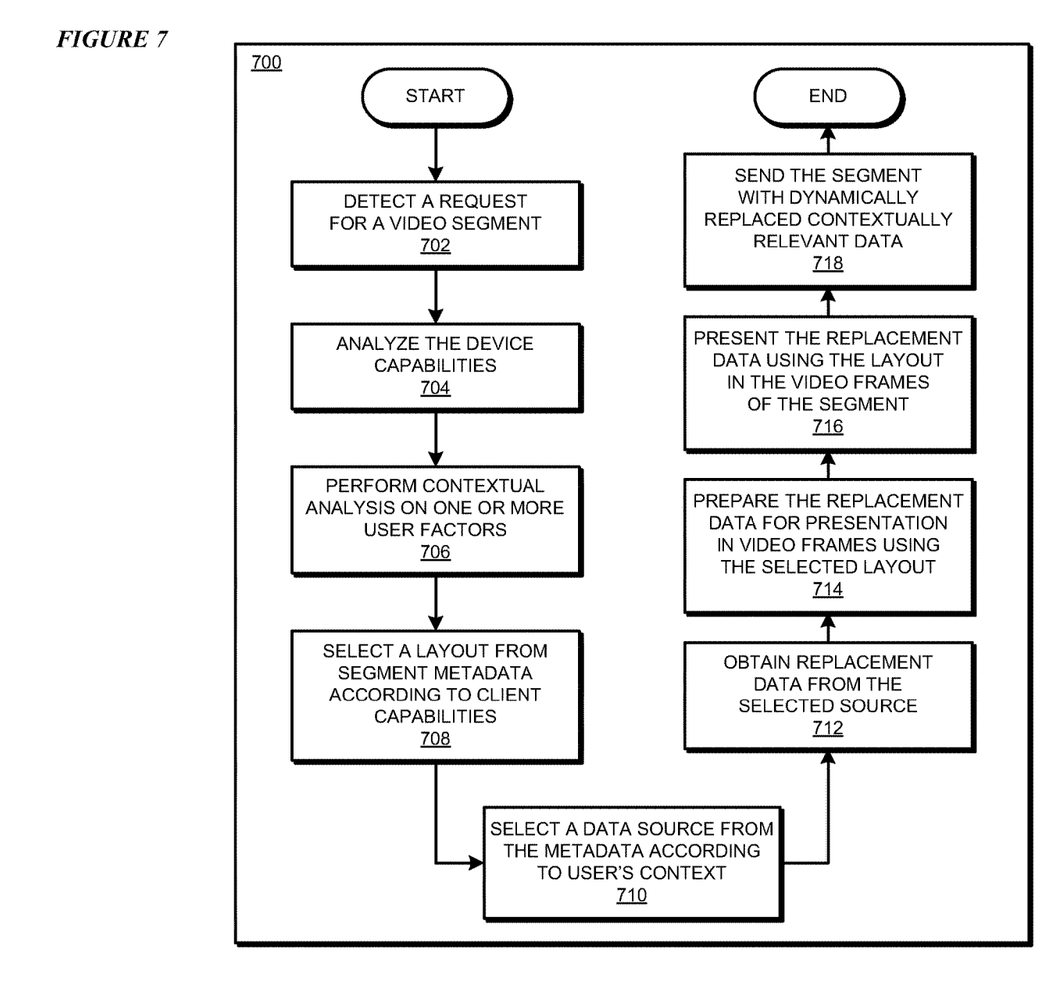
FIG. 7 depicts a flowchart of an example process for dynamic and contextual data replacement in video content in accordance with an illustrative embodiment.

With reference to FIG. 7, this figure depicts a flowchart of an example process for dynamic and contextual data replacement in video content in accordance with an illustrative embodiment. Process 700 can be implemented in application 502 in FIG. 5.

The application detects a request for a video segment (block 702). The application analyzes the device capabilities (block 704). The application performs contextual analysis on one or more user factors associated with the request (block 706).

Depending on the device capabilities, the application selects a layout from the metadata of the enhanced version of the requested segment (block 708). The application selects a data source from the metadata from where replacement data can be sourced according to the user's context (block 710).

The application obtains the replacement data from the selected data source (block 712). The application prepares the replacement data for presentation using the selected layout (block 714). In a frame where an original data overlay exists, the application replaces or overlays the original data overlay with the layout containing the replacement data (block 716). The application sends the modified segment, which now includes contextually relevant replacement data with the original video content (block 718). The application ends process 700 thereafter.

Thus, a computer implemented method, system or apparatus, and computer program product are provided in the illustrative embodiments for dynamic and contextual data replacement in video content and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
analyzing a frame of a video segment to determine that the frame includes a set of pixels that represent a first data in a data overlay in the frame;
constructing a set of layouts, each layout in the set of layouts being usable to replace the data overlay;
selecting a data source, the data source being usable to obtain a replacement data as a replacement for the first data;
constructing a metadata, wherein the metadata includes a first reference to the set of layouts and a second reference to the data source; and
associating the metadata with the video segment to form an enhanced video segment;
obtaining, from the data source, replacement data;
arranging the replacement data in a layout selected from the first reference according to a device feature of a device on which the video segment is to be presented;
changing, in the frame, a set of pixels that represents the first data in the data overlay in the frame, the changed set of pixels representing the layout containing the replacement data; and
transmitting a modified video segment, the modified video segment comprising a video content from the video segment and the changed set of pixels.

2. The method of claim 1, further comprising:
analyzing a user factor to establish a context in which the user will view the video segment; and
correlating, as a part of obtaining the replacement data, the replacement data with the context.

3. The method of claim 1, wherein the first reference comprises a reference to the selected layout.

4. The method of claim 1, wherein the second reference comprises a reference to a set of data sources, the selected data source being a member of the set of data sources.

5. The method of claim 1, wherein the replacement data is more current relative to the first data.

6. The method of claim 1, wherein the replacement data is more detailed relative to the first data.

7. The method of claim 1, wherein the replacement data is less detailed relative to the first data.

8. The method of claim 1, wherein the replacement data is correct and the first data is incorrect.

9. The method of claim 1, further comprising:
detecting, from the device, a request for the video segment;
receiving a set of user factors associated with a user who will be viewing the video segment, a user factor being usable to compute a context of the viewing; and
determining a set of device features associated with the device.

10. The method of claim 9, wherein the user factor is indicative of a personal circumstance of the user in which the user is expected to view the video segment.

11. The method of claim 9, wherein the user factor comprises a geographical location of the user.

12. The method of claim 9, wherein the user factor comprises a role assigned to the user.

13. The method of claim 9, wherein the user factor comprises a level of language comprehension associated with the user.

14. The method of claim 9, wherein the user factor comprises an age of the user.

15. The method of claim 9, wherein the user factor comprises a desired setting of the user.

16. The method of claim 1, wherein the device feature comprises a color palette supported by the device.

17. A computer usable program product comprising a computer-readable storage device, and program instructions stored on the storage device, the stored program instructions when executed by a processor cause operations of a method to be performed, the method comprising:
analyzing a frame of a video segment to determine that the frame includes a set of pixels that represent a first data in a data overlay in the frame;
constructing a set of layouts, each layout in the set of layouts being usable to replace the data overlay;
selecting a data source, the data source being usable to obtain a replacement data as a replacement for the first data;
constructing a metadata, wherein the metadata includes a first reference to the set of layouts and a second reference to the data source; and
associating the metadata with the video segment to form an enhanced video segment;
obtaining, from the data source, replacement data;
arranging the replacement data in a layout selected from the first reference according to a device feature of a device on which the user will view the video segment;
changing, in the frame, a set of pixels that represents the first data in the data overlay in the frame, the changed set of pixels representing the layout containing the replacement data; and
transmitting a modified video segment, the modified video segment comprising a video content from the video segment and the changed set of pixels.

18. The computer usable program product of claim 17, wherein the stored program instructions are stored in a computer readable storage device in a data processing system, and wherein the stored program instructions are transferred over a network from a remote data processing system.

19. The computer usable program product of claim 17, wherein the stored program instructions are stored in a computer readable storage device in a server data processing system, and wherein the stored program instructions are downloaded over a network to a remote data processing system for use in a computer readable storage device associated with the remote data processing system.

20. A computer system comprising a processor, a computer-readable memory, and a computer-readable storage device, and program instructions stored on the storage device for execution by the processor via the memory, the stored program instructions when executed by the processor cause operations of a method to be performed, the method comprising:
analyzing a frame of a video segment to determine that the frame includes a set of pixels that represent a first data in a data overlay in the frame;
constructing a set of layouts, each layout in the set of layouts being usable to replace the data overlay;
selecting a data source, the data source being usable to obtain a replacement data as a replacement for the first data;

constructing a metadata, wherein the metadata includes a first reference to the set of layouts and a second reference to the data source; and associating the metadata with the video segment to form an enhanced video segment;

obtaining, from the data source, replacement data;

arranging the replacement data in a layout selected from the first reference according to a device feature of a device on which the user will view the video segment;

changing, in the frame, a set of pixels that represents the first data in the data overlay in the frame, the changed set of pixels representing the layout containing the replacement data; and transmitting a modified video segment, the modified video segment comprising a video content from the video segment and the changed set of pixels.

* * * * *